(12) United States Patent
Redfoot

(10) Patent No.: US 10,122,865 B1
(45) Date of Patent: Nov. 6, 2018

(54) TELEPHONE RING INDICATOR

(71) Applicant: Bryan Redfoot, Transfer, PA (US)

(72) Inventor: Bryan Redfoot, Transfer, PA (US)

( * ) Notice: Subject to any disclaimer, the term of this patent is extended or adjusted under 35 U.S.C. 154(b) by 2 days.

(21) Appl. No.: 15/292,112

(22) Filed: Oct. 12, 2016

(51) Int. Cl.
*H04M 1/00* (2006.01)
*H04M 19/04* (2006.01)
*H04M 3/537* (2006.01)

(52) U.S. Cl.
CPC ......... *H04M 19/048* (2013.01); *H04M 3/537* (2013.01)

(58) Field of Classification Search
CPC ... G02B 6/0008; H04B 1/3888; H04M 1/185; H04M 1/22; H04M 2250/12
USPC ............. 379/88.01–88.19, 376.1; 455/127.1, 455/575.6
See application file for complete search history.

(56) References Cited

U.S. PATENT DOCUMENTS

| 6,122,366 | A | 9/2000 | Veschi | |
|---|---|---|---|---|
| 2007/0037605 | A1 | 2/2007 | Logan | |
| 2007/0093220 | A1* | 4/2007 | Choi | H03F 1/0211 455/127.1 |
| 2014/0203939 | A1* | 7/2014 | Harrington | H04M 11/04 340/584 |
| 2014/0333448 | A1* | 11/2014 | Jungvid | G01J 1/42 340/815.4 |
| 2015/0311939 | A1* | 10/2015 | Zalon | F21V 33/0052 455/575.6 |

FOREIGN PATENT DOCUMENTS

| CN | 1977175 | 6/2007 |
|---|---|---|
| CN | 20198599 | 9/2011 |
| CN | 102480817 A | 5/2012 |
| CN | 103002143 B | 12/2014 |
| KR | 10077798581 | 11/2007 |

OTHER PUBLICATIONS

Aaroncake website showing a ringing phone light flasher, http://www.aaroncake.net/circuits/pflash.asp.
Algo Solutions website showing an LED visual indicator for a telephone, http://www.algosolutions.com/products/audible-and-visual-alerting/1127-visual-alerter.html.
Wizard's Toolbox page of the Sandman website, http://www.sandman.com/Wizard.html.
Message Waiting Products page of the Sandman website, http://www.sandman.com/messwait.html.
Information sheets for the SIP Office Ringer, made by CyberData.
Viking Product Manual: SR-IP SIP Loud Ringer! Visual Ring Indicator.
Information sheets for the Algo 8180 SIP Audio Alerter.
(Continued)

*Primary Examiner* — Solomon G Bezuayehu
(74) *Attorney, Agent, or Firm* — William F. Lang, IV; Lang Patent Law LLC

(57) ABSTRACT

An incoming call indicator for a telephone is structured to detect light emitted from a light source that is already present on the telephone, and that is illuminated in response to an incoming telephone call and/or waiting message. If the telephone utilizes different on/off cadences for the light to indicate external calls, internal calls, and/or waiting messages, then the cadence is detected, and an audio or visual output device is used to emit a signal corresponding to the specific detected event.

17 Claims, 6 Drawing Sheets

(56) References Cited

OTHER PUBLICATIONS

How Relays Work. Galco, http://www.galco.com/comp/prod/relay.html.
Photodiode, Wikipedia, https://en.wikipedia.org/wiki/Photodiode.
Phototransistor Tutorial, Radio-Eiectronics.com, http://www.radio-eiectronics.corn/info/data/semicond/phototransistor/photo_transistor.php.
Relay Switch Circuit, Electronics Tutorials, http://www.electronics-tutorials.ws/blog/relay-switch-circuit.html.

* cited by examiner

TELEPHONE RING INDICATOR

TECHNICAL FIELD

The present invention relates to telephone ring indicators. More specifically, a means of detecting a ring or a message based on the cadence of an illuminated ring indicator on a telephone, and providing an audible or visual indicator of the ring or message, is provided.

BACKGROUND INFORMATION

It is often difficult for personnel working in loud environments, or in large spaces such as warehouses or factories, to hear a standard ring of a telephone. Providing an enhanced ring signal in the form of a louder audible signal and/or a visual signal increases the likelihood that someone will become aware of the telephone call, or of the presence of a voice mail message, and respond accordingly. Numerous solutions to this problem have been proposed. However, many of these solutions require that the device be connected to the telephone system, raising possible concerns about equipment warranties and/or restrictions on equipment connected to telephone lines.

One example of a presently available device is disclosed in KR 10077798581, describing a phone holder for use with a vacuum cleaner. An optical sensor is used to measure light, with this measurement being used in connection with an illumination source that is illuminated when the phone rings. A noise generator is also provided, as well as a means of shutting off the motor of the cleaner when a call comes in.

CN 1977175 discloses a device for informing a mobile telephone user of calls and text messages when the user is far from a cellular transmission terminal. The device includes a microwave field detector, a loud sound signal generator, a bright oriented light signal generator, a communications unit, and an external warning signal generator. The device is placed about 40 cm. from the mobile telephone, and detects the microwave signal between the tower and the cell phone. Once the signal is detected, the user is alerted to the presence of a telephone call or SMS message.

US 2007/0037605 discloses a system for controlling the magnitude or timing of the alert signal generated to notify the user of a portable telephone of an incoming phone call. The alert may be modified depending on the absolute location of the phone, the relative location of the phone with respect to another object, the level of ambient light or sound, the time of day, the movement of the telephone, and/or whether the phone is being held by the user.

CN 20198599 discloses a mobile phone capable of automatically adjusting ring volume and brightness. The mobile phone measures ambient sound, and adjusts volume accordingly. The talk volume and vibration are also adjusted similarly. Brightness is adjusted based on a light sensor.

CN 102480817A discloses a light switch device controlled via telephone. The device includes a control circuit and a triggering circuit. The control circuit includes four diodes forming a rectifier bridge, a two-way diode, a current limiting resistor, and a photoelectric coupler. The triggering circuit includes an and gate, a not gate, as well as a resistor and capacitor for delaying time. A light dependent resistor is used in connection with another resistor for monitoring day and night. The two inputs of the rectifier bridge are connected to the telephone line. The voltage required to bypass the bidirectional diode is set to be the voltage that occurs when the telephone rings. The bidirectional diode is connected to the output of the rectifier. The output of the two-way diode is connected through a resistor to the anode and of the LED for the photo coupler. The negative output terminal of the LED is connected to the negative output of the rectifier bridge. The phototransistor of the photoelectric coupler has a collector connected to a power supply, and emitter that is connected to one input of a nand gate, with the other input being from the light sensitive resistor. The circuit is designed so that the light will light if the telephone is rung, and it is nighttime.

CN 103002143B discloses a control method for incoming calls and short messages for a mobile phone. An acceleration sensor on the mobile phone is commenced when the phone receives a short message or telephone call. If the acceleration value is larger than an acceleration threshold value, and infrared emitting device (separate from the phone) is actuated, and directed towards and infrared receiving device arranged beside the mobile phone. If the light intensity received by the infrared light receiving device is above a certain threshold, vibration and sound volume of the indicator are increased, otherwise, the vibration and sound volume are decreased.

U.S. Pat. No. 6,122,366 discloses a telephone with an environmentally influenced call indicator. The telephone includes a photo sensor that measures a level of ambient light. If the ambient light is above a predetermined threshold, the phone will ring in response to incoming calls. If the ambient light is below the threshold, then the telephone will not ring in response to a ringing signal. Alternatively, the sensor can output a signal with a pulse density that varies according to ambient light, with multiple thresholds being set, and different pulse densities corresponding to different intervals between thresholds. A low level ring can thus be produced for periods of low ambient light. As another alternative, a sound sensor can also be incorporated. The phone can be set up to avoid ringing in a dark, quiet environments, but to ring if either the ambient light or sound level is loud.

The Aaroncake website discloses a ringing phone light flasher. The device connects to the telephone line, and current will flow through the connection to the phone line when the voltage exceeds that of the 20 V Zener diodes. Current flowing through this connection will activate an opto-isolator, and will then use a transistor to activate a relay to supply power to the lights.

Algo provides a telephone ring indicator that can adjust the volume of the audible ring signal based on noise within its environment, and can provide a visual LED strobe signal for quiet locations. The device must be connected to a Power over Ethernet network switch.

The CyberData SIP Office Ringer connects to a Power over Ethernet switch, and provides an audible ring indicator.

The Viking SR-IP Loud Ringer provides an audible ring indication, adjusting the volume to compensate for background noise, and also provides a visual ring indication. It is connected to a local area network.

Many of the above devices require an electrical connection to the telephone and/or telephone system in order to function, thus potentially raising concerns about device warranties, and restrictions on equipment connected to telephone lines. Accordingly, there is a need for a device that can provide a ring indication without an electrical connection to the telephone or telephone system, avoiding any warranty issues, avoiding connection to the telephone line and associated restrictions, and simplifying installation. There is a further need to detect an incoming call and/or the presence of a message utilizing signals provided externally to the telephone, and to distinguish between an incoming call and a message.

SUMMARY

The above needs are met by an incoming call indicator for a telephone. The telephone has a telephone light source that intermittently emits light when an incoming telephone call or a message is present. The incoming call indicator has a light sensor structured to receive light from the telephone light source, and a signaling device that is structured to generate an audio signal or a visual signal. The incoming call indicator further has a control architecture structured to receive a signal from the light sensor, and to activate the signaling device upon receiving a signal from the light sensor.

The above needs are further met by a method of indicating an incoming call or waiting message on a telephone. The telephone has a telephone light source that intermittently emits light when an incoming telephone call or a message is present. The method includes receiving light from the telephone light source, and providing a first electrical signal in response to receiving light from the telephone light source. A second electrical signal is provided to an audio or visual output device in response to the first electrical signal, thereby activating the output device in response to the second electrical signal.

These and other aspects of the invention will become more apparent through the following description and drawings.

BRIEF DESCRIPTION OF THE DRAWINGS

Like reference characters denote like elements throughout the drawings.

DETAILED DESCRIPTION

Figure 1:
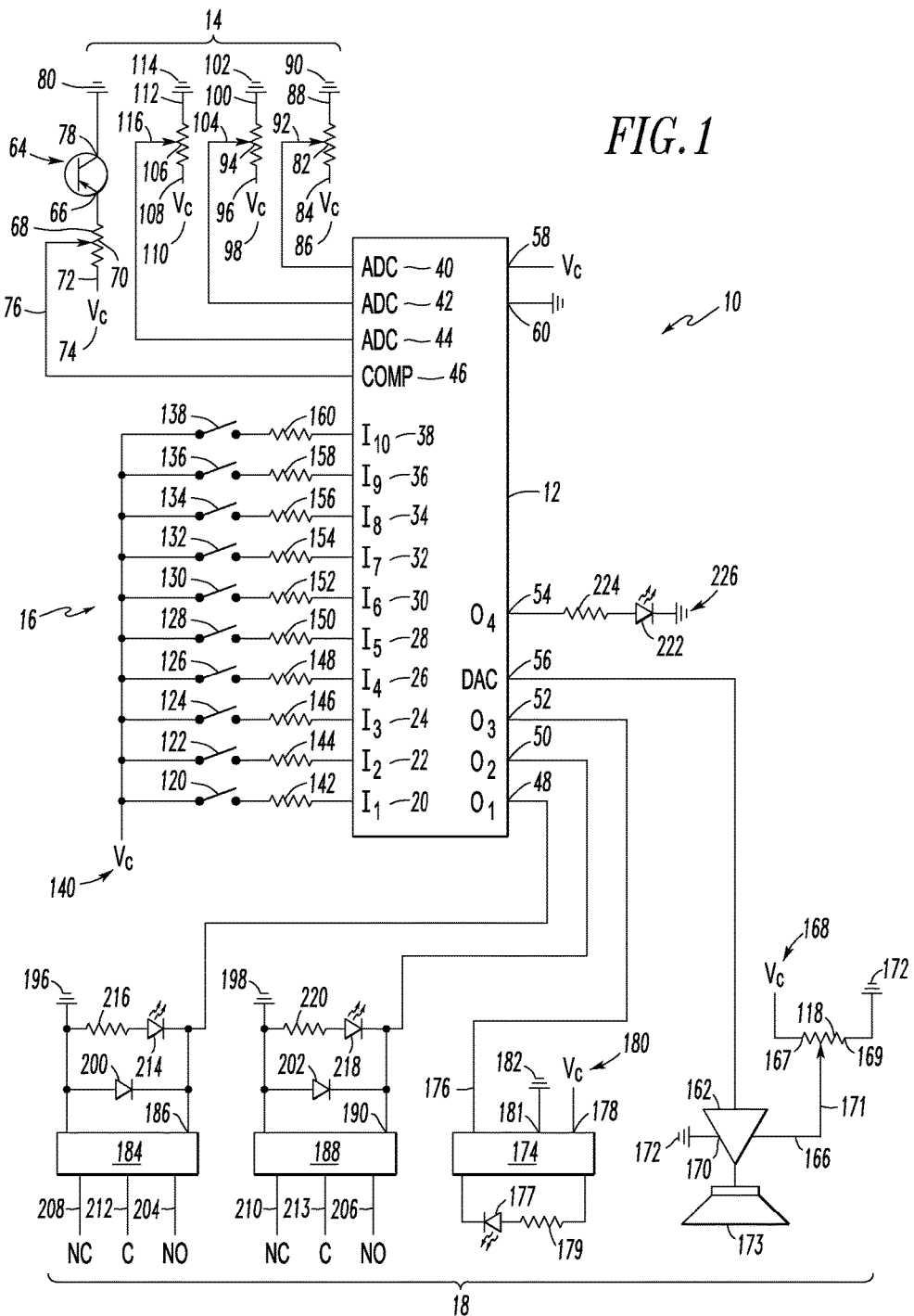
FIG. 1 is a schematic diagram of a telephone ring indicator.

Referring to the drawings, an example of a telephone ring indicator 10 is illustrated. The illustrated example of a telephone ring indicator 10 includes a control architecture which in the illustrated example is a microcontroller 12, a ring detection system 14, a plurality of control inputs 16 to permit a user to determine how the telephone ring indicator 10 will respond to various signals from the telephone, and a plurality of outputs 18 to signal the presence of a telephone call or a message.

The microcontroller 12 controls the overall operation of the system. A variety of controllers could be selected, including general-purpose programmable microcontrollers, programmable logic devices such as field programmable gate arrays, application specific integrated circuits, and custom integrated circuits. The illustrated example of the microcontroller 12 includes a plurality of general input ports, with the illustrated example including ten general input ports 20, 22, 24, 26, 28, 30, 32, 34, 36, and 38. Additionally, the illustrated example of microcontroller 12 includes a plurality of analog to digital conversion (ADC) ports, shown herein as ADC port 40, ADC port 42, and ADC port 44. Lastly, a comparison (COMP) input port 46 is provided.

Turning to the outputs of the microcontroller 12, the illustrated example includes five output ports. These include general output ports 48, 50, 52, 54. Additionally, a digital to analog converter (DAC) port is shown as DAC port 56. As is well known in the art of microcontrollers, the microcontroller 12 will also include a voltage input 58 for supplying power, and a ground port 60.

Figure 3:
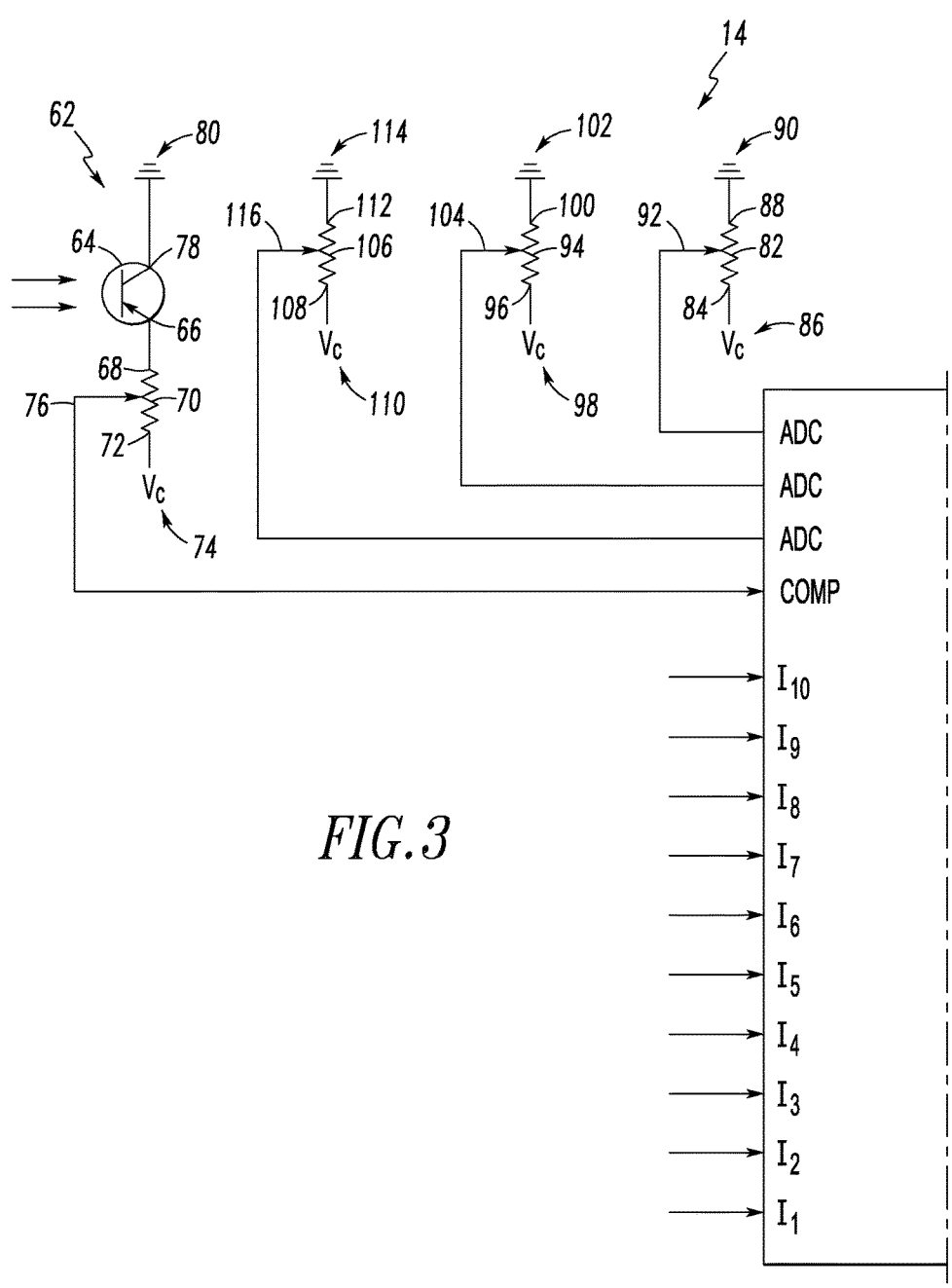
FIG. 3 is a schematic diagram of a partial set of input devices for the telephone ring indicator of FIG. 1.

Referring to FIG. 3, the telephone ring indicator 10 includes a ring detection circuit 62. The ring is detected by a light sensor 64 that is placed adjacent to a light that is already present on many standard telephones. The light sensor 64 will have a sensitivity zone that includes the 400 nm to 700 nm wavelengths. The illustrated example of the light sensor 64 is a phototransistor. A photodiode or other light sensor could be used in other examples. The illustrated example of a phototransistor 64 includes a collector 66 that is electrically connected to the output 68 of a potentiometer 70. The input 72 of the potentiometer 70 is connected to a conventional power supply 74 that is structured to supply a voltage level appropriate for the inputs of the microcontroller 12. The movable output 76 of the potentiometer 70 is connected to the comparison port 46. The emitter 78 of the phototransistor 46 is connected to ground 80. Thus, when light strikes the phototransistor 64, current will flow through the phototransistor 64, thus permitting current to flow through the potentiometer 70. The voltage passing through the potentiometer's variable output 76 will depend on the amount of light striking the phototransistor 64 as well as the position of the variable output 76 with respect to its minimum and maximum voltage positions. Thus, the sensitivity of the ring detection circuit 62 can be adjusted by adjusting the position of the variable output 76.

Each of the ADC ports 40, 42, and 44 includes a potentiometer connected thereto in a similar manner in order to regulate various aspects of decision making within the algorithm programmed or designed into the microcontroller 12. A potentiometer 82 has an input 84 connected to a conventional voltage source 86 and output 88 connected to ground 90. The potentiometer 82 includes a variable output 92 that is connected to the ADC port 40. The potentiometer 82 is used to supply a voltage that is correlated to a ring cadence that will be detected by the optical sensor 64 in the event of receiving a telephone call from a telephone elsewhere within the building or organization. This voltage can be set to the voltage corresponding to the proper ring cadence as described in greater detail below.

Similarly, a potentiometer 94 has an input 96 connected to a conventional voltage source 98 and output 100 connected to ground 102. The potentiometer 94 includes a variable output 104 that is connected to the ADC port 42. The potentiometer 94 is used to supply a voltage that is correlated to a ring cadence that will be detected by the optical sensor 64 in the event of receiving a telephone call from an external telephone, which in some instances will be different from the cadence detected when a call is received from an internal telephone. This voltage can be set to the voltage corresponding to the proper ring cadence as described in greater detail below.

In a similar manner, a potentiometer 106 has an input 108 connected to a conventional voltage source 110 and output 112 connected to ground 114. The potentiometer 106 includes a variable output 116 that is connected to the ADC port 44. The potentiometer 106 is used to supply a voltage that is correlated to a ring cadence that will be detected by the optical sensor 64 in the event of receiving a message, for example, a message stored within an answering machine or a voice mail system associated with the telephone system. In some instances, the cadence detected by the optical sensor 64 will be different from the cadence detected when a telephone call is received. This voltage can be set to the voltage corresponding to the proper ring cadence as described in greater detail below.

Figure 4:
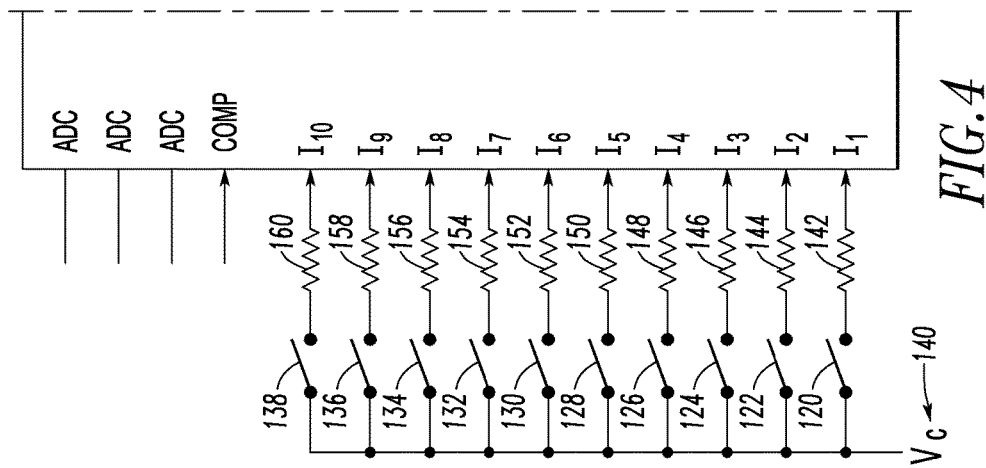
FIG. 4 is a schematic diagram of a partial set of input devices for the telephone ring indicator of FIG. 1.
Figure 2:
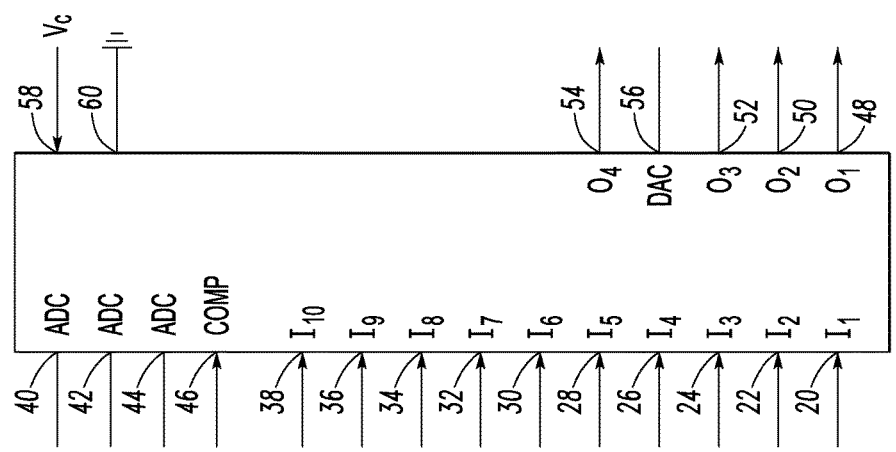
FIG. 2 is a schematic diagram of a microcontroller for the telephone ring indicator of FIG. 1.

Referring to FIG. 4, other inputs to the illustrated example of the ring detection device are controlled by a group of switches connected to other input ports of the microcontroller 12. In the illustrated example, switches 120, 122, 124, 126, 128, 130, 132, 134, 136, 138, are connected between the voltage source 140, through a resistor 142, 144, 146, 148, 150, 152, 154, 156, 158, 160, respectively, to the input ports 20, 22, 24, 26, 28, 30, 32, 34, 36, 38, respectively. Each of the switches 120, 122, 124, 126, 128, 130, 132, 134, 136, 138 is thus capable of supplying either a "0" or a "1" value to the input port 20, 22, 24, 26, 28, 30, 32, 34, 36, 38 to which it is connected. The operation of these switches is described in greater detail below.

Figure 5:
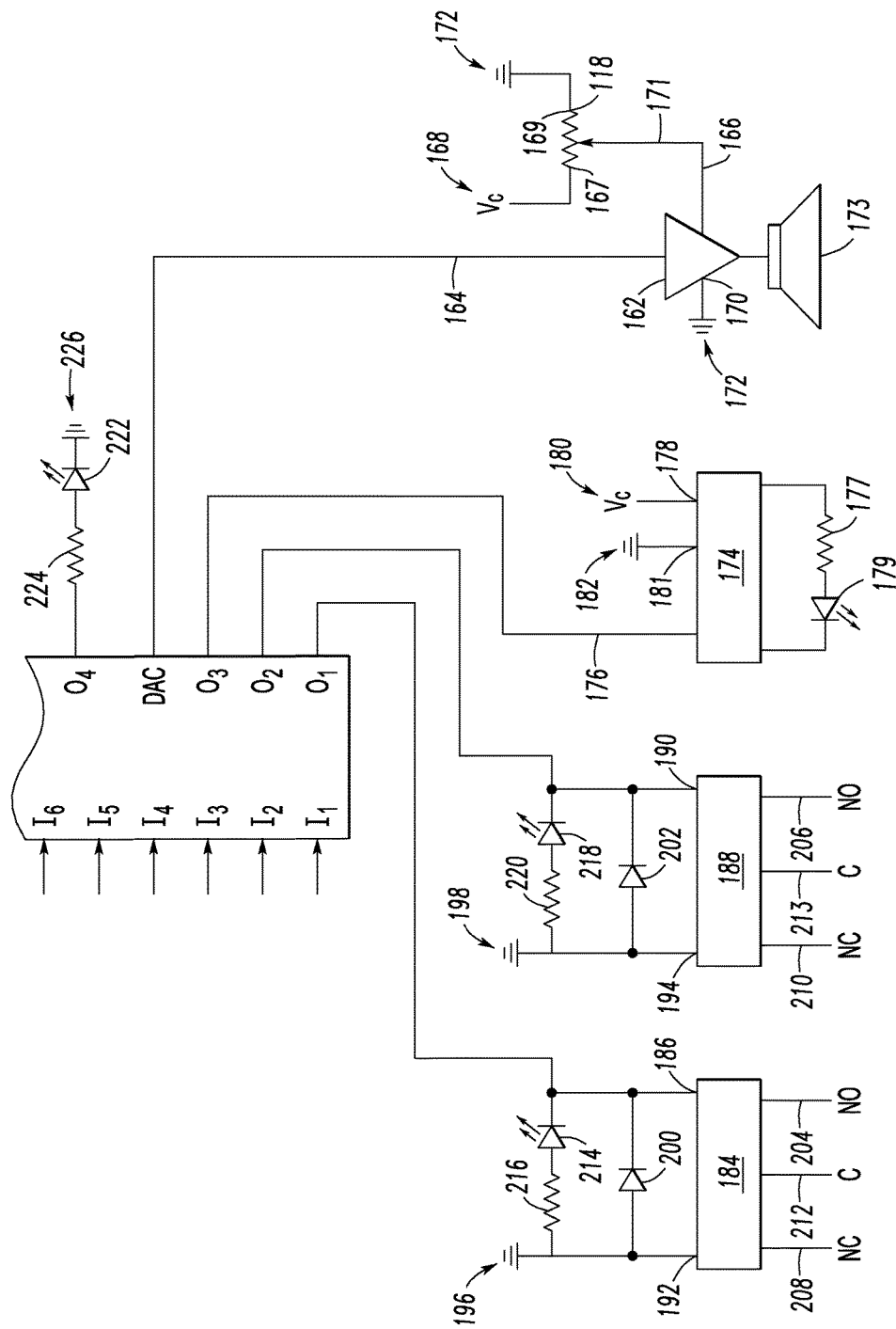
FIG. 5 is a schematic diagram of an example set of output devices for the telephone ring indicator of FIG. 1.

Referring to FIG. 5, the ring detection device 10 may include any or all of various output devices shown in the illustrated example. An audio amplifier 162 may include an input 164 that is connected to the DAC output port 56, thus supplying an analog input to the amplifier 162. Those skilled in the art of amplifiers will recognize that the amplifier 162 includes a voltage input 166 for connection to a voltage source 168, and a ground connection 170 for connection to a ground 172. The desired volume level of the output of the ring detection device 10 may be adjusted using a potentiometer 118. The potentiometer 118 has an input 167 connected to the voltage source 168 and output 169 connected to ground 172. The potentiometer 118 includes a variable output 171 that is connected to the voltage input 166. By varying the position of the variable output 171, the voltage supplied to the amplifier 162 can be varied, thus varying the volume of the audio output of the amplifier 162. An additional audio device, for example, the illustrated Piezo 108 dB sound generator 173, can be electrically connected to the amplifier 162.

In some locations, depending on the level of noise and/or need to maintain quiet, a visual indication of a message or incoming call may be desirable. In such a case, a light emitting system, which in the illustrated example is a strobe circuit 174, may be provided. The strobe circuit 174 includes a trigger 176 that is electrically connected to the output 52 of the microcontroller 12. The strobe circuit 174 also includes a voltage input 178 that is connected to a conventional voltage source 180, and a ground connection 181 that is connected to a ground 182. When the strobe circuit 174 is triggered, a light source such as the illustrated LED 177 (protected by the resistor 179) is activated and deactivated at a predetermined frequency. Using an example of the ring detection device 10 in which both an audio signaling device and visual signaling device are present, the user may choose whether to utilize the audio amplifier 162, the strobe circuit 174, or both to indicate an incoming telephone call or voice mail message. Different strobe rates may be utilized to signal different events.

If conveying an indication of a ring for some distance is desired, one or more relays may be included. The illustrated example includes a relay 184 having a terminal 186 connected to output port 48, and a relay 188 having a terminal 190 connected to output port 50. Each of the relays 184, 188 includes a terminal 192, 194, respectively, connected to ground 196, 198, respectively. A flywheel diode 200 may connect the ground terminal 192 to the voltage in terminal 186. Similarly, a flywheel diode 202 may connect the ground terminal 192 to the voltage input terminal 190. Each of the flywheel diodes is used to dissipate stored energy within the coils of the inductor to which it is connected when the inductor is switched off. Each relay 184, 188 includes a normally open contact 204, 206 that is open unless the relay is activated, at which time the contact 204, 206 becomes closed. Each relay also includes a normally closed contact 208, 210 that is closed unless the relay is activated, at which time the contact 208, 210 becomes open. A common contact 212, 213 is also provided. Thus, each of the relays 184, 188 can function as a switching device for a wide variety of other devices that can be used to indicate the presence of a call or a message.

A light source such as an LED 214 (provided in series with a resistor 216) is connected between the output port 48 and ground 196, providing a visual indication of when a condition that would activate relay 184 (in the illustrated example, a telephone ring) occurs. Similarly, a light source such as the LED 218 (provided in series with a resistor 220) is connected between the output port 50 and ground 198, providing a visual indication of when a condition that would activate relay 188 (in the illustrated example, the presence of a message) occurs. An additional light source, such as the LED 222, provided in series with the resistor 224, is connected between the output port 54 and the ground 226, providing a visual indication of the occurrence of a designated event, which in the illustrated example is an incoming telephone call.

Depending upon the specific options desired, the switches 120, 122, 124, 126, 128, 130, 132, 134, 136, 138 can be configured to control a wide variety of functions. As one example, the switch 120 can be used to activate or deactivate and audible notification of an incoming telephone call, with a "0" (open) value deactivating audible notification, and a "1" (closed) value activating audible notification of an incoming telephone call. Similarly, switch 122 can be used to activate or deactivate visual notification of an incoming telephone call, with a "0" (open) value deactivating visual notification, and a "1" (closed) value activating visual notification of an incoming telephone call.

In the illustrated example, the switches 124, 126 are used to select between four different audible incoming telephone call notifications. An example configuration is shown in the following table.

| Switch 124 | Switch 126 | Audible output |
|---|---|---|
| 1 | 1 | Ring ring |
| 1 | 0 | Chirp chirp |
| 0 | 1 | Ding dong |
| 0 | 0 | Nat nat |

The switch 128 can be used to activate or deactivate and audible notification of the presence of a message, with a "0" (open) value deactivating audible notification, and a "1" (closed) value activating audible notification of the presence of a message. Similarly, switch 130 can be used to activate or deactivate visual notification of the presence of a message, with a "0" (open) value deactivating visual notification, and a "1" (closed) value activating visual notification of the presence of a message.

In the illustrated example, the switches 132, 134 are used to select between four different audible message notifications. An example configuration is shown in the following table.

| Switch 132 | Switch 134 | Audible output |
|---|---|---|
| 1 | 1 | Ring ring |
| 1 | 0 | Chirp chirp |
| 0 | 1 | Ding dong |
| 0 | 0 | Nat nat |

In the illustrated example, the switches 136, 138 are used to select between four different cadences for audio and visual notification of the presence of a message. An example configuration is shown in the following table.

| Switch 136 | Switch 138 | Output cadence |
|---|---|---|
| 1 | 1 | Follow detector cadence. |
| 1 | 0 | Trigger the audio and visual indicator once every 10 seconds. |
| 0 | 1 | Trigger the audio and visual indicator once every 30 seconds. |
| 0 | 0 | Trigger the audio and visual indicator once every minute. |

Figure 6A:
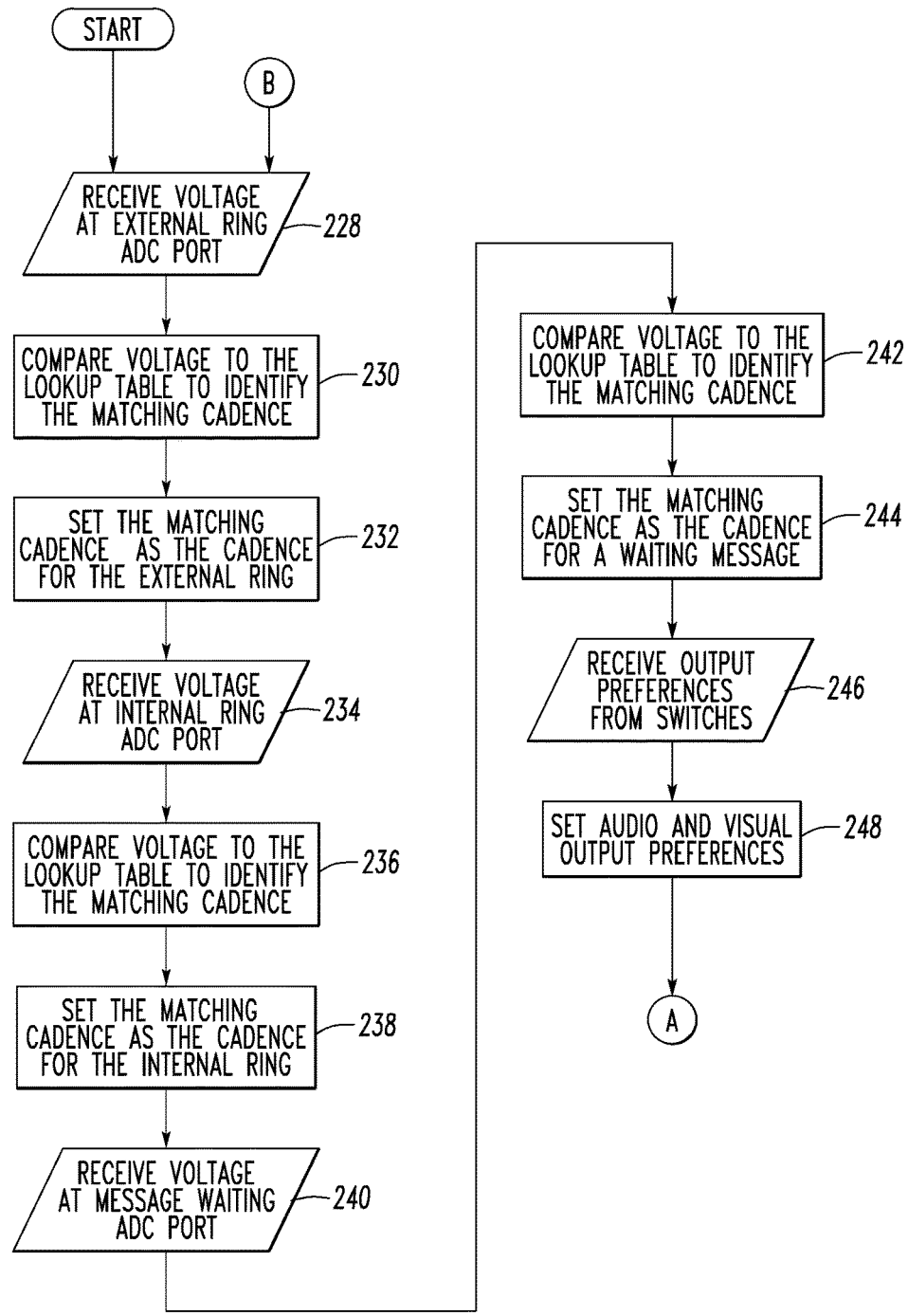
FIGS. 6A-6B are a flowchart depicting an example of the operation of the telephone ring indicator of FIG. 1.
Figure 6B:
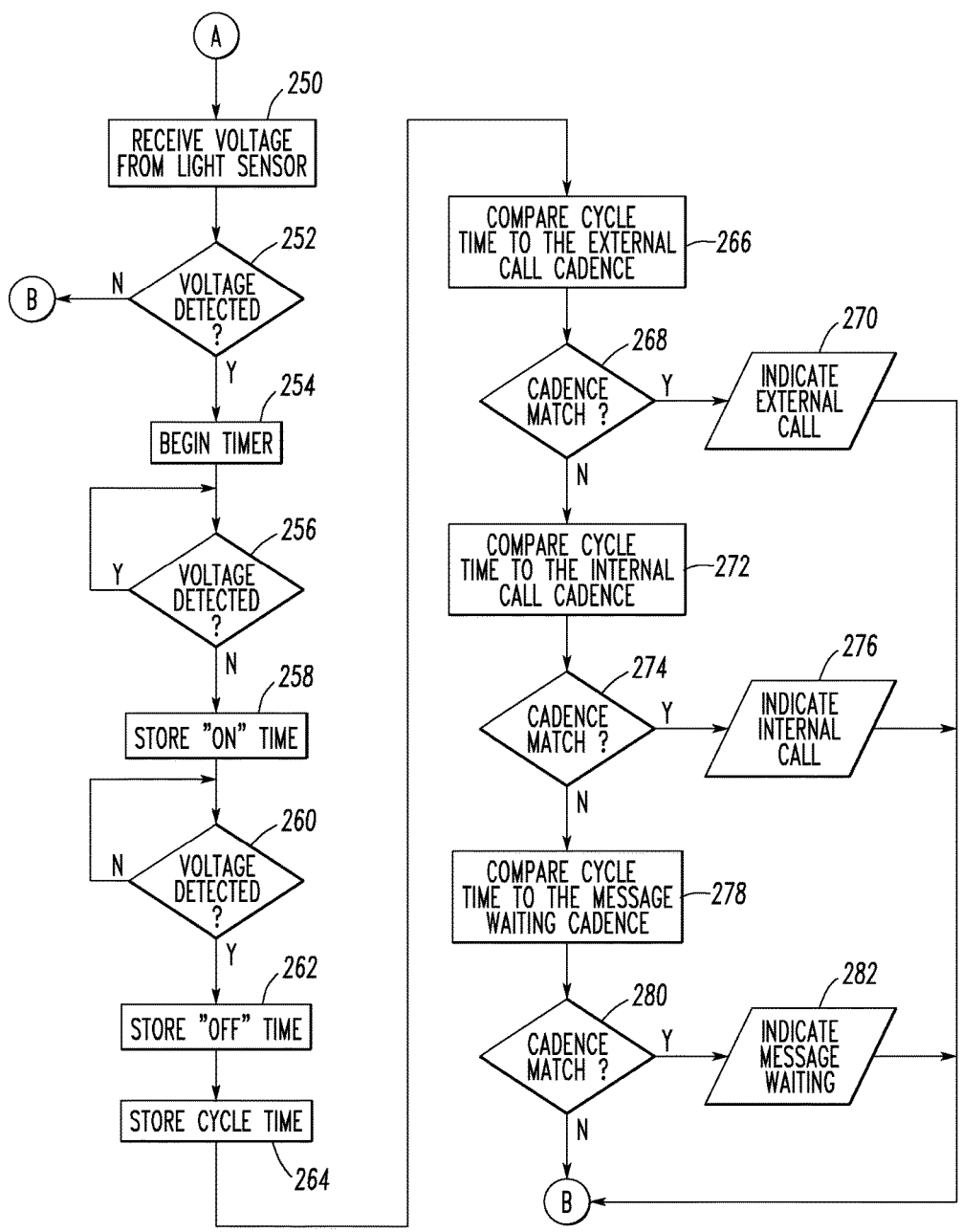

The operation of the microcontroller 10 is illustrated in FIGS. 6A-6B. As this flowchart is reviewed, it will become apparent that many alternative sequences of steps will accomplish essentially the same purpose, in the illustrated sequence represents just one possible example. This example begins at step 228 with receiving the selected voltage from the potentiometer 82 at ADC port 40. This voltage is then compared at step 230 to a lookup table that correlates various voltage ranges with variance cadences. Because the cadence is intended to be perceivable by humans, it is assumed to be between 0 and 60 Hz. Once the cadence matching the selected voltage has been found in the lookup table, that cadence becomes the cadence that is sought by the microcontroller 12 when looking for an external ring at step 232. Next, the voltage from the potentiometer 94 is received at port 42 at step 234. This voltage is again compared with the lookup table to determine the corresponding cadence at step 236. At step 238, the matching cadence is set as the cadence that will be sought by the microcontroller 12 when looking for an internal ring.

The process continues with receiving the voltage at ADC port 44 from potentiometer 106, at step 240. This voltage is then compared with the lookup table at step 242 to determine the matching cadence. This cadence will then be set to the cadence that the microcontroller 12 seeks when searching for a waiting voice mail message at step 244. The various inputs to the ports 20-38 are received at step 246 and the characteristics of the desired output signals are sent at step 248 as described above.

Once the appropriate parameters are determined, the voltage from the light sensor 64 is received at the COMP port 46 at step 250. If no voltage is detected at step 252, the system re-examines the input at ports 40-44 and 20-38, and then checks the COMP port 46 again, repeating the process insulate voltage signal is received. Once a voltage is received, a timer begins at step 254. The system continues to monitor port 46 at step 256 insulate voltage is no longer detected, at which point the time that the ring indicator light was on is stored at step 258. The system continues to monitor the port 46 at step 260, until the light sensor 64 again receives light. At this point, the time that the light was off is stored at step 262, and the entire cycle time is stored at step 264. Any or all of the "on" time, the "off" time, or the cycle time can be used as the defining characteristic of the cadence.

In the illustrated example, the detected cycle time is compared to the external ring cadence at step 266. If the detected cadence matches the cadence that was set at step 232 as the comparison is made at step 268, then the preselected audio and/or visual external ring indications are output at step 270. If no match is found, the detected cadence is compared with the cadence set for the internal ring at step 272. If the cadence set at step 238 is matched at step 274, then the appropriate audio and/or visual internal ring indications are output at step 276. If a match still has not been found, then the detected cadence will be compared with the voicemail cadence at step 278. If a match is found with the cadence that was set at step 244 at step 280, then the appropriate audio or visual alerts of a message waiting are output at step 282. Regardless of whether an output signal is generated, the system then returns to querying the various input ports.

Connection of the ring indicator 10 to the telephone is accomplished by securing the light sensor 64 in a position wherein it can detect light emitted by the appropriate light on a telephone, and in which the light sensor 64 is shielded from other environmental light. This can be accomplished by placing the light sensor 64 directly over the light on the telephone, and then applying a cover over both the light sensor 64 and the telephone light. Alternatively, if the viewing the light on the telephone is desired, the light sensor 64 can be placed in close proximity with the light, and a cover or shell having a polarized light filter may be placed over the light as well as the light sensor 64. As another alternative, the ring indicator 10 may be connected to a phone having a visual ring indicator located below the handset by attaching a light guide such as a fiber optic cable in proximity with the ring indicator lights. Some examples of the light guide may include a polarized film embedded in the top layer. This polarized film may be in 90° opposition to the polarized film disposed within the optical detector shell. This polarized film will resist the entrance of environmental light into the light guide. Light from the ring indicator may then enter the light guide, which will terminate in a position wherein it is operatively connected to the light sensor 64. The light sensor 64 can thus be placed in a location having more space to accommodate its thickness.

Once the light sensor 64 is appropriately positioned and shielded, then the housing for the remainder of the ring indicator 10 can be appropriately mounted, depending on the location and type of telephone.

Once the ring detection device is connected to a telephone system, the ring detection device 10 can be programmed so that the microcontroller 12 properly interprets the signals received from the light on the telephone. Initially, the switches 120-138 are placed in their desired positions.

The telephone to which the telephone ring detector 10 is attached is called to generate a ring. While the telephone is ringing, the potentiometer 70 is adjusted until the LED 222 is lit only when the phone is ringing. Once the LED 222 lights every time the phone rings, and only when the phone rings, then the sensitivity of the light sensor 64 has been properly adjusted.

Next, the telephone is called from an internal telephone. As the telephone is ringing, the potentiometer 82 is adjusted until the LED 214 is lit while the telephone is ringing, and only while the telephone is ringing. Alternatively, if the telephone does not have different cadences for internal and external rings, then the potentiometer 82 is adjusted to one of its extreme positions, thus selecting a cadence that is unlikely to appear. Similarly, the telephone is called from an external telephone, and the potentiometer 94 is adjusted until the LED 214 remains lit only while the telephone is ringing. Several test calls are made from internal and external telephones to ensure that the LED 214 lights only in response to an internal telephone call, and the LED 218 lights only in response to an external call. Lastly, a voicemail messages left on the phone, and potentiometer 106 is adjusted until LED 218 is lit.

Once the system is set up, several additional telephone calls are made to the telephone, and several messages are left on the phone and then deleted, to ensure that all indicators are working properly. Once proper operation is verified, the physical hardware is secured in place as desired.

The telephone ring indicator therefore provides a means of alerting personnel in a spacious and/or loud environment to the presence of a telephone call and/or a waiting message. Some examples of the telephone ring indicator will distinguish between external telephone calls, internal telephone calls, and/or messages, and supply different notifications based on the specific event. Other examples may include audible and/or visual outputs that are customizable according to the preferences of the user. The telephone ring indicator may be installed on the exterior of a telephone without modification to the telephone itself or to the telephone line.

A variety of modifications to the above-described embodiments will be apparent to those skilled in the art from this disclosure. Thus, the invention may be embodied in other specific forms without departing from the spirit or essential attributes thereof. The particular embodiments disclosed are meant to be illustrative only and not limiting as to the scope of the invention. The appended claims, rather than to the foregoing specification, should be referenced to indicate the scope of the invention.

What is claimed is:

1. An incoming call indicator for a telephone, the telephone having a telephone light source that intermittently emits light when an incoming telephone call or a message is present, the incoming call indicator comprising:
a light sensor structured to receive light from the telephone light source, the light sensor being structured to provide a voltage in response to light received by the light sensor;
a signaling device that is structured to generate an audio signal or a visual signal upon receipt of an electrical signal, the signaling device not connected to the telephone; and
a control architecture structured to receive the voltage from the light sensor, to determine whether the telephone light source is on or off based on the voltage, and to determine a received on and off cadence of the telephone light source based on the voltage, to compare the received on and off cadence with a plurality of predetermined event indicating on and off cadences, and to provide the electrical signal to the signaling device upon the received on and off cadence substantially matching one of the event indicating on and off cadences, the electrical signal being different for each event, the electrical signal corresponding to the event indicated by the received on/off cadence; and
the signaling device being structured to output a different audio or visual signal corresponding to each event upon receipt of an electrical signal corresponding to each event.

2. The incoming call indicator according to claim 1, wherein the control architecture is a microcontroller.

3. The incoming call indicator according to claim 1, further comprising a sensitivity adjustment operatively connected to the light sensor.

4. The incoming call indicator according to claim 3, wherein the sensitivity adjustment comprises a potentiometer having a fixed resistance path operatively connected in series with a voltage source, the light sensor, and a ground, and a variable connection operatively connected to the control architecture.

5. A method of indicating an incoming telephone call or waiting message on a telephone, the telephone having a telephone light source that intermittently emits light when the incoming telephone call or the waiting message is present, the method comprising:
providing a light sensor positioned to receive light from the telephone light source and to provide a voltage in response to light received from the telephone light source;
providing a control architecture;
providing an audio or visual output device not connected to the telephone;
receiving light from the telephone light source using the light sensor;
providing a voltage from the light sensor in response to receiving light from the telephone light source;
using the control architecture to receive the voltage from the light sensor and to detect an on/off cadence of the telephone light source based on the voltage;
using the control architecture to compare the detected on and off cadence to a plurality of predetermined on and off cadences for an event;
using the control architecture to provide an electrical signal to the audio or visual output device upon a match between the detected on/off cadence and predetermined on and off cadence for an event, the electrical signal corresponding to the event for which the on/off cadence was detected, each event corresponding to a different electrical signal; and
emitting an audio or visual signal from the output device in response to the electrical signal, the audio or visual signal corresponding to each event being different from the audio or visual signals corresponding to other events.

6. The incoming call indicator according to claim 1, wherein each event is selected from the group consisting of an incoming external call, a message waiting, or an incoming internal call.

7. The method according to claim 5, wherein each event is selected from the group consisting of an incoming external call, a message waiting, or an incoming internal call.

8. The incoming call indicator according to claim 6, further comprising a message waiting cadence selection device.

9. The incoming call indicator according to claim 8, wherein the message waiting cadence selection device includes a potentiometer having a fixed resistance path connected in series with a voltage source and a ground, and a variable connection operatively connected to the microcontroller.

10. The incoming call indicator according to claim 9, wherein the control architecture includes a lookup table for correlating a voltage at the variable connection to a message waiting cadence.

11. The incoming call indicator according to claim 6, further comprising an internal ring cadence selection device.

12. The incoming call indicator according to claim 11, wherein the internal ring cadence selection device includes a potentiometer having a fixed resistance path connected in series with a voltage source and a ground, and a variable connection operatively connected to the microcontroller.

13. The incoming call indicator according to claim 12, wherein the control architecture includes a lookup table for correlating a voltage at the variable connection to an internal ring cadence.

14. The method according to claim 7, further comprising predetermining the cadence for a waiting message by providing a user-input voltage corresponding to a predetermined cadence for a waiting message to the control architecture.

15. The method according to claim 14, further comprising comparing the voltage to a lookup table, the lookup table associating various user-input voltage levels with corresponding telephone light source cadences.

16. The method according to claim 7, further comprising predetermining the cadence for an internal telephone call by providing a user-input voltage corresponding to a predetermined cadence for an internal telephone call to the control architecture.

17. The method according to claim 16, further comprising comparing the voltage to a lookup table, the lookup table associating various user-input voltage levels with corresponding telephone light source cadences.

* * * * *